Patented Feb. 13, 1945

2,369,434

UNITED STATES PATENT OFFICE 2,369,434

SPECIALIZED VULCANIZATION PRODUCT

John W. Church, Mount Lebanon, Pa., assignor to Falk & Company, Carnegie, Pa., a corporation of Pennsylvania No Drawing. Application April 14, 1942,
Serial No. 438,904

16 Claims. (Cl. 106—223)

This invention relates to a specialized vulcanization product.

The object of the invention is to obtain a vulcanized product containing a resin and fatty acid triglycerides which has solubility limited to a point at which it is insoluble in aliphatic hydrocarbon solvents but soluble in aromatic hydrocarbon solvents.

In subjecting resins and fatty acid triglycerides to vulcanization as with sulphur, sulphur chloride and equivalent vulcanizing elements, such as selenium and tellurium, or the other halides of sulphur, or its substantially equivalent elements, two highly desirable results in the vulcanized product are obtainable. One such result is to deprive the resins and the unsaturated portion of the fatty acid triglycerides of capacity for elemental conversions, such as oxygenation; thus imparting to them and to the composition in which they are included particularly long life because of their resistance to deterioration attendant upon aging. Another important result of a vulcanization treatment is to induce in the substances which are subjected to it such substitution and intermolecular linkages as to give a product having elastomeric properties.

In my companion application, Serial No. 438,903, filed of even date herewith, I have disclosed the conduct of a vulcanization treatment on unsaturated fatty acid triglycerides and resins which is of such sort and which is carried to and discontinued at such stage that the product is a base or vehicle suitable for use in or as the film-forming content of evaporative coating compositions, and which base or vehicle is soluble in common aliphatic hydrocarbon solvents. Herein one of my objects is on the contrary to produce a base or vehicle for evaporative type coatings which base or vehicle shall have solvency with aromatic hydrocarbon solvents, but shall have insolubility in aliphatic hydrocarbon solvents.

Another object of my invention is to produce a vulcanization product which is insoluble in aliphatic hydrocarbon solvents at least, but in which the product possesses in such order the property of elasticity or distensibility and recoverability, and has such cohesion or internal continuity that it has elastomeric properties in particularly high order. This I primarily obtain by forming a product the component or components of which are in substantial entirety in a high stage of vulcanization, but which are not the products of an over-cure of the sort by which factice is produced.

In attaining the embodiment of my invention I carry vulcanization in a starting material comprising unsaturate resin and fatty acid triglycerides to a relatively advanced stage, in which suitable indication such as the acquisition of insolubility may be taken to indicate a desired completion of the vulcanization. At that stage I separate in the mass that content which is insoluble in a determined order from the more soluble content of the reaction product, making thus a separation into a highly viscous and inherently elastic material and a less viscous more soluble material. Thus assuming that the primarily desired product of limited solubility is to be a film-forming substance such as is suitable for use as the base or vehicle in an evaporative coating composition with aromatic hydrocarbon solvents but not with aliphatic hydrocarbon solvents, I treat the total reaction product with a selected proportion of aliphatic hydrocarbon solvent of predetermined kauri-butanol value to remove in solution the more soluble content of the reaction product. By so doing I obtain a base or vehicle which is not only resistant to elemental conversions and which is thus resistant to oxygenation and the deterioration and incompatibilities resulting from the progress of oxygenation in a film, but also obtain a coating composition which possesses in particularly high order the combined properties of hardness, toughness and elasticity, and the use of which is indicated for all purposes in which a coating may come into contact with aliphatic hydrocarbon substances having solvency with resins and fatty acid triglycerides. This principle is contemplated as applied to the reaction products from all starting materials comprising unsaturated resins and unsaturated fatty acid triglycerides which are known to the art and upon which vulcanization has been conducted by any of the known and accepted vulcanizing agents. Also beyond the lower limit of solubility which I establish, variance in solubility characteristics and other properties of the primary product are obtainable and are within my contemplation. I herein exemplify embodiment of my invention as follows:

Example 1

250 parts by weight of 6% limed rosin and 100 parts by weight of mineral oil were heated together to a temperature within the vulcanization range for sulphur and specifically to a temperature of about 350° F. and 20 parts by weight of ground sulphur were added. The reaction proceeded at first quietly and then with substantial evolution of hydrogen sulphide for about 15 minutes with some exothermic rise in temperature. At that time I added 75 parts by weight of blown soya bean oil, and bringing the temperature back to about 350° F. added 6 additional parts by weight of ground sulphur. After a short interval of treatment of about 5 minutes, I began a series of tests at intervals of about 1 minute each. These tests consisted in placing 2 cc. of the reaction mass together with 2 cc. of aliphatic petroleum solvent having a kauri-butanol value of 28.5, in a test tube at a temperature of about 200° F. An additional 6 cc. of the same solvent at room temperature was added and the temperature of the solution was reduced to room temperature by cooling. When the solution, cooled to room temperature, deposited a precipitate in a quantity as great as 30% the volume of liquid in the test tube, the reaction was checked by lowering the temperature of the reaction mass below 300° F.

The total reaction product was then thinned with 300 parts by weight of aliphatic hydrocarbon solvent of 28.5 kauri-butanol value and was cooled to 70° F. The solution was then stirred with 1400 parts by weight of similar 28.5 kauri-butanol value solvent and was permitted to settle. A precipitate equal to about 60% the weight of the initial reaction product separated out and the supernatant liquid was drawn off.

The precipitate was drained to free it from undissolved solvent and a sample of the precipitate was then stirred at normal room temperature with an equal volume of the aromatic hydrocarbon solvent, toluol. This toluol was of the commercial grade, and of about 95 kauri-butanol value. A clear solution was formed which did not show a cloud upon standing for 5 minutes at normal room temperature.

The solubility test is above given as providing as close an approximation as may be made to procedure appropriate under the variant conditions which may be practiced by the art in following the teaching of my invention. There is inherently variance in the reactivity of the different starting materials which will be used, such as the various oils of vegetable and marine origin which contain unsaturated fatty acid triglycerides, in the resin used, and in the pretreatment to which the oil and resin has been subjected, or in the absence of it. Variance will also be encountered in particular lots of sulphur, the fineness of their grinding and in using the substantial equivalents for sulphur and in their preparation for use. A man skilled in the art may, however, by making routine observation as to the progress of vulcanization and by application of the test which has been given readily standardize the procedure as to materials, time and temperature in the reaction mass.

The above example gives limed rosin and blown soya bean oil as specific components in the starting material. It is to be understood, however, as above indicated that the oil may be otherwise pretreated, or may be used raw, and that the rosin may be used raw, or may be otherwise pretreated as by esterification or by a treatment with zinc or other suitable metallic modifying agent. Similarly both the components may be in raw condition in the starting material. Also, as above indicated, other oils similar to soya bean oil in that they have a content of unsaturated fatty acid triglycerides, may be used and other resins possessing unsaturation and which are of thermoplastic and oil soluble sort, such as coumarone-indene resins, terpene resins, petroleum resins, kauri gum, Congo gum, and the like, may be used in place of raw or modified rosin.

Returning to the specific exemplification of my invention given in Example 1, I have determined that the precipitation product obtained as above described has dissolved about 30% to 50% its own weight of the solvent from which it is precipitated. It is intolerant of as little as an equal weight of added solvent of 28.5 kauri-butanol value.

When reduced to 40% solids by cutting with toluol, benzol, or other aromatic hydrocarbon solvent, the precipitated product as a deposited film hardened quickly to a tack-free film which combined the properties of hardness, toughness and elasticity. Upon distilling the supernatant liquid obtained in the precipitation step for the removal of a large proportion of the solvent there was obtained a greasy and tacky residue of adhesive and plasticizing properties, which contained most of the mineral oil included in the starting material.

*Example 2*

The procedure of Example 1 was in substance duplicated by similarly subjecting 200 parts by weight of raw rosin and 75 parts by weight of kettle-bodied linseed oil with 100 parts by weight of mineral oil, to vulcanization with 35 parts by weight of ground sulphur. The reaction was similarly discontinued at a stage when observation had been made of the precipitation of at least 30% the volume of the liquid made as in Example 1 by heating 2 cc. of the reaction mass with 2 cc. aliphatic hydrocarbon solvent of 28.5 kauri-butanol value, adding 6 cc. of similar solvent and cooling to room temperature. It was observed that a similar stage in the vulcanization treatment was not reached until the treatment had been continued several minutes longer than was the case in Example 1.

The product of the vulcanization reaction was treated identically as in Example 1, and the precipitated product was in all observable characteristics except color identical with the similar product obtained in Example 1.

*Example 3*

250 parts by weight of ester gum and 100 parts by weight of raw linseed oil were subjected to vulcanization treatment as in Example 2, and the reaction product was similarly treated.

The precipitated product appeared identical to the products obtained from Example 2. It was noted that during the vulcanization step of the process the time of treatment up to a stage at which the insolubility check was effective was several minutes longer than in Example 1.

*Example 4*

200 parts by weight of coumarone-indene resin melting about 80° C. (ball and ring) and 100 parts by weight of kettle-bodied soya bean oil, together with 100 parts by weight of mineral oil were subjected to vulcanization under the same general conditions as in Example 2, making, however, a total addition of 35 parts of ground sulphur. The reaction was continued to a stage at which response to the precipitation test described in Example 1 was had, this stage being reached only after a somewhat longer period of treatment than in Example 1.

The product of the vulcanization reaction was treated as in Example 1, about the same proportion of precipitate being obtained. The precipitation product was very much like that obtained in Example 1 and responded to all the critical properties of the similar product which have been noted with respect to the product of Example 1, being similarly capable of solution with aromatic hydrocarbon solvents of such order that a solution of the precipitated product with an equal volume of commercial toluol did not show a cloud upon standing for 5 hours at normal room temperature. The color of the product containing coumarone-indene resin was substantially darker than those containing the rosin derivatives.

*Example 5*

60 parts by weight of rosin and 40 parts by weight of dehydrated castor oil were fused together with 50 parts of mineral oil and dissolved in 350 parts by weight of aliphatic hydrocarbon solvent having a kauri-butanol value of 28.5. This starting material was treated with agitation and temperature control with 20 parts of sulphur monochloride at temperatures between 70° F. and 100° F. After treatment for about 10 minutes, the reaction mass became cloudy and a precipitate began to come down. When precipitation ceased and the supernatant liquid was drawn off, the precipitate was found to have properties corresponding closely to the precipitate formed as in the preceding examples. It was completely soluble with equal parts by weight of toluol.

I applied the procedure of Example 5 to combinations of rosin, ester gum and coumarone-indene resin with soya bean oil, both raw and blown, and linseed oil, both raw and kettle-bodied. The results in each instance were satisfactory, the precipitate in each instance possessing approximately the same solubility characteristics as the precipitated products from procedure in which sulphur was used as the vulcanizing agent.

In every other example as in Example 1, the supernatant liquid drawn off in the solvent precipitation step may be distilled to recover solvent and to obtain a relatively soft residue of plasticizing and adhesive properties.

It may be stated generally that there is reasonable tolerance in the point at which the vulcanization reaction is discontinued, due to the fact that it is not the object of the invention to obtain a final product soluble in aliphatic hydrocarbon solvents, and due to the fact that there is a substantial range within the conduct of the vulcanization process, and the composition of that portion of the product which is precipitated, giving the precipitate adequate solubility in aromatic hydrocarbon solvents. It may thus be stated generally that in order to retain solubility in aromatic hydrocarbon solvents, the vulcanization should not be carried substantially further by added stimulus or long-continued treatment after there is a clear indication that a condition of relative insolubility in aliphatic hydrocarbon solvents has been reached.

As is the experience of the art, the halide vulcanizing agents, such as sulphur chloride, tend to react more violently than the elemental vulcanizing agents, such as sulphur. As above appears, however, a vulcanization procedure utilizing either type of vulcanizing agent may be used as a preliminary to precipitation for producing either the base or vehicle of an evaporative type coating of the sort indicated, or for producing a product of greater insolubility.

The products hereinabove specifically exemplified are vulcanized compositions usable as a base or vehicle in evaporative type coatings in that they are usefully soluble in hydrocarbon solvents, such as the aromatic hydrocarbon solvents having a kauri-butanol value not less than 50, and are insoluble in hydrocarbon solvents having a kauri-butanol value not greater than 28.5, such as the aliphatic hydrocarbon solvent commonly known as mineral spirits. This general definition is based on the usability of the material with evaporative solvents from which it will not cloud out at any normally encountered temperatures, and in any normally usable dilutions. Although a weight ratio of 4 to 1 solvent to solids is desirably used in precipitating the material, it is to be noted that the precipitate is then intolerant even of an equal volume of the solvent from which it has been precipitated. This may be attributed to the dissolution and removal in the supernatant liquid of those components of the initial vulcanization product which tend more toward solubility, and the inclusion in the precipitate only of the less soluble components of the initial vulcanization product. It may, therefore, be said that the precipitate is not usable as a base or vehicle with solvents having a kauri-butanol value no higher than 28.5 from which it clouds at normal room temperature when included in equal volumes. On the other hand it is to be considered as usable with solvents having a kauri-butanol value approximately as high as 50, from which it does not cloud on long-continued standing at normal room temperature when mixed with the solvent in equal volumes.

My product presents a marked distinction from factice in that it is not, like factice, lacking in the properties of toughness and cohesion. This toughness and cohesion is had by my precipitated product, even though the precipitation step largely removes the plasticizing content which is included in the total product of the vulcanization step.

The foregoing is written primarily from the viewpoint of obtaining a product of limited solubility which is usable as the base or vehicle of a coating composition. Inasmuch as the examples above given are directed specifically to that utility, and inasmuch as a solvent separation is utilized to obtain a product soluble within a limited range substantial latitude is, as has been above explained, permissible in the proportioning of resins and unsaturated fatty acid triglycerides to be included in the final product, and in the inclusion of other ingredients in the initial starting material. Also as has been explained, because of the fact that the precipitation as above exemplified limits the solubility of the starting material it is unnecessary in such examples to exercise exactitude in determining the point at which the vulcanization reaction is checked.

It is possible also to obtain products suitably defined by the same limited solubility range which, while being useful as the base or vehicle of coating compositions, have utility other than as such bases or vehicles. In obtaining these added utilities certain considerations in the proportioning of the components included in the starting material and in the order of vulcanization which is effected in that material, are of importance. Thus the ratio of fatty acid triglycerides to resin in the starting material is increased over that suitable for products having their indicated utility solely as a base, or vehicle for evaporative coating compositions, if more elastomeric bodies are to be obtained. Desirably, I use a lesser proportion of vulcanizing agent when it is purposed to obtain a product having utility additional to its use as a coating composition base or vehicle. By complying with such requirement, I am able to obtain a product, insoluble in aliphatic hydrocarbon solvents and soluble in aromatic hydrocarbon solvents, which is useful as a molding composition in addition to being useful as the base or vehicle of a coating composition, and am able also to obtain an elastomeric product which is useful because of its rubber-like properties as well as having utility as the base or vehicle of a coating composition.

As exemplary of procedure by which a product having molding properties is obtainable I give the following:

Example 6

60 parts of 6% limed rosin and 40 parts of blown soya bean oil were heated together to a temperature of 350° F. and treated with 8 parts of sulphur flour at this temperature. The reaction was allowed to proceed to such stage that when 2 cc. of the reaction mass are removed as a sample, dissolved in 2 cc. of aliphatic hydrocarbon having a kauri-butanol value of 28.5 and 6 cc. additional of said solvent are added, a precipitate equivalent to about 30% of the volume of the mixture is obtained. When this point was reached the reaction mass was cooled below 300° F. and 66 parts of aliphatic hydrocarbon thinner of a kauri-butanol value of 28.5 were added and stirred thoroughly into the mass, which was cooled to 70° F. and stirred into 332 parts by weight of aliphatic hydrocarbon solvent of 28.5 kauri-butanol value. A precipitate formed and settled to the bottom of the vessel, and the supernatant liquid was withdrawn as in Example 1 above. The precipitated product responded to the same critical solubility tests as the product of Example 1.

If the precipitate is to be used as a coating composition it is dissolved in a hydrocarbon of higher kauri-butanol value; specifically, a solvent of not less than 50 kauri-butanol value in proportions such as the particular use may dictate. If the material is to be used as a molding plastic, the precipitate is transferred preferably to a roller mill, and by the effects of temperature and repeated exposure of all portions of its mass to the atmosphere, its solvent is driven off, and a product which is very viscous but somewhat fluid at the milling temperature results. This product is then incorporated with wood flour and other fillers, and may be used satisfactorily in the production of thermoplastic molded articles.

The formation and recovery of products having additional utility because of their rubber-like elastomeric properties may be exemplified as follows:

Example 7

To 60 parts by weight of G to H body (on the Gardner-Holdt scale) dehydrated castor oil which had been heated to 600° F. and held for a 24 inch string, 40 parts by weight of coumarone-indene resin were added and the temperature was again raised to 600° F. The mass was held until a small pill cooled on glass to room temperature loses its opalescence and becomes clear. The material was then cooled to 450° F. and dissolved in 33 parts of aliphatic hydrocarbon solvent of 28.5 kauri-butanol value.

The product upon cooling to room temperature was treated with 2.5 parts by weight of sulphur monochloride and allowed to gel. The product upon transfer to a two-roller mill had its solvent driven off by a combination of friction-developed heat and by exposure of its intimate mass to the atmosphere, resulting in a solvent-free elastic body which remains elastic upon cooling. Upon incorporation intimately within the mass of sulphur and certain rubber accelerators, such as diphenyl-guanidine, benzo-mercapto-thiazole, etc., and subsequent curing at normal rubber curing temperatures, elastic bodies of considerable strength were obtained, the stress-strain modulus of such bodies being controlled as in the practice of curing rubber by the amount of vulcanizing agent used and the time of curing. Fillers such as carbon black may be incorporated to modify the properties of the cured stock.

The product responded to the same critical solubility tests as the precipitated product obtained in Example 1.

In the procedure of this example vulcanization, without precipitation, is used to produce a body soluble in hydrocarbon solvent having a kauri-butanol value down to about 50. Care in the use of the vulcanizing agent must therefore be exercised. Sulphur chloride in a quantity equal to 2.5% the weight of the starting material is given, and I have found that the percentage must be kept below 5% if the desired solubility of the product is to be had. If sulphur is used, it should be similarly proportioned with respect to its comparative effectiveness.

Example 8

The procedure was the same as in Example 7, except that the heat-treated dehydrated castor oil was diluted by adding an additional 266 parts, a total of about 300 parts, of 28.5 kauri-butanol value aliphatic hydrocarbon before vulcanization. Now with the addition of the same amount of sulphur chloride and coumarone-indene resin, the mass, instead of gelling as in Example 7 after it has reached a certain stage of vulcanization, became cloudy and a precipitate fell to the bottom of the reaction vessel. This precipitate, upon separation from the supernatant liquid and treatment on the two-roller mill in the same manner as described above, exhibited properties somewhat similar to those of the product obtained from Example 7, with the exception that it possessed greater strength and less of a tendency to be tacky. However, both materials either precipitated or unprecipitated are insoluble in aliphatic hydrocarbon solvents of 28.5 kauri-butanol value in the proportion of one part precipitate to one part of said solvent, but are soluble in equal parts of a hydrocarbon solvent of 50 kauri-butanol value or greater, in the same sense that the precipitated product of Example 1 is soluble. That is, the solution will stand for a long period of time at room temperature without showing indication of a separation.

Coating compositions may thus be obtained which are extremely elastic by dissolving the precipitate, or a milled product of the same, in hydrocarbon solvents possessing a kauri-butanol value of 50 or more.

It is to be understood that, whereas blown soya bean oil and rosin have been given above as the starting material in exemplifying a molding composition made in accordance with my invention and dehydrated castor oil and coumarone-indene resin have been given in exemplifying elastomeric products made in accordance with my invention, it is to be understood that (as in Examples 1 to 5 inclusive) all the drying and semi-drying oils composed substantially of unsaturated fatty acid triglycerides and all the other oil soluble thermoplastic resins may be used to replace the components of the starting materials as given in Examples 6, 7 and 8.

It has been noted that in making products for use as molding compositions, and products of rubber-like sort, the proportion of resin to fatty acid triglycerides should be decreased below a ratio which is suitable if the product is intended solely for use as the base, or vehicle, of an evaporative type coating composition. In no instance, however, do I wholly omit resin from the starting material. If resin is eliminated, or reduced so far in content that its presence is negligible under the conditions of the vulcanization procedure, the product will in practical effect be factice. As factice is insoluble even in the solvents of relatively high solvent power, and also lacks continuity and cohesion, a product which substantially responds to a definition as factice possesses neither the regulated solubility nor the properties of strength and elastic recovery. In any variant of my product resin is therefore included in substantial proportion, equal to at least 10% of the total weight of the starting material. No definitely critical proportions can be given, because the proportion of resin may be varied within wide limits, but it may be said that I have not succeeded in attaining satisfactory products from a starting material which contains less than 10% of resin, and in terms of method that percentage may be taken as the lower limit of a substantial resin content. In the procedure described in all the examples except Example 7, some of the resin content of the starting material usually is included in the dissolved phase in the precipitation step of the process. I have found that in making molding compositions the resin should be included in such quantity that the resin content does not substantially exceed a 2:1 ratio with respect to the oil content, in the starting material. In making the more elastomeric products, I have found that the resin content should be included in less than a 1:1 ratio with respect to the oil content of the starting material. In a starting material purposed solely as a coating composition base, or vehicle, however, resin may be included in a relatively great proportion, even a proportion as great as 4:1 or 5:1 with respect to the oil content of the starting material has given satisfactory products. As to the proportioning of the components of the starting materials which are retained in the precipitated products it is impossible to speak specifically, and it suffices to say that in all of them the vulcanization products of both oil and resin are present, and that the products purposed alternatively for use as a component of a molding composition, and as an elastomeric body, contain a proportion of resin below that which suitably might be included in a product purposed solely for use in coating compositions.

As solubility in the comparative sense is a matter of primary importance herein, some specific consideration should be given to the evaporative solvents the use of which is indicated and to the terms used in defining their solvent power. Thus it should be explained that the kauri-butanol values hereinabove given are standardized against chemically pure toluol as 100; so that commercial toluol is given as having a kauri-butanol value of about 95, mineral spirits as having a kauri-butanol value of about 28.5, and all other solvents noted having analogous kauri-butanol values. As the term "kauri-butanol value" is herein used throughout the specification and claims without qualification, it is therefore to be taken to mean kauri-butanol value standardized against chemically pure toluol.

The test of solubility to which my product responds has been given as the ability to remain in clear solution with equal parts by weight of an organic solvent having a kauri-butanol value (standardized against C. P. toluol) of at least 50. This means that my product is soluble in various mixed aromatic and aliphatic evaporative type solvents in addition to the aromatic hydrocarbon solvents exemplified above. Cyclic hydrocarbon solvents other than the aromatics such as gum spirits of turpentine, wood turpentine, and various terpene cuts such as alpha-pinene, dipentene, terpinene, terpinolene, and the like, respond to the definition given above. Certain evaporative solvents derived from petroleum, which by virtue of the treatment involved in their revovery are largely of cyclic structure, also respond to that definition.

It is to be understood generally that the terms and exemplifications herein used are descriptive and illustrative rather than restrictive, and that numerous changes may be made in the compositions embodying my invention, and in the procedure by which they are made while remaining within the bounds of my invention as defined in the appended claims.

I claim as my invention:

1. A tough and coherent vulcanized body composed essentially of the combined vulcanization products of fatty acid triglycerides and oil soluble thermoplastic resin, the said vulcanized body being insoluble in evaporative hydrocarbon solvents having a kauri-butanol value no greater than 28.5 and being soluble in evaporative hydrocarbon solvents having a kauri-butanol value greater than 50.

2. A tough and coherent precipitate from the combined vulcanization products of fatty acid triglycerides and oil soluble thermoplastic resin, the said precipitate being composed essentially of both vulcanized fatty acid triglycerides and vulcanized oil soluble thermoplastic resin, the said precipitate being insoluble in evaporative hydrocarbon solvents having a kauri-butanol value no greater than 28.5 and soluble in evaporative hydrocarbon solvents having a kauri-butanol value greater than 50.

3. A tough and coherent precipitate from a combined vulcanization product of fatty acid triglycerides and oil soluble thermoplastic resin vulcanized to a stage of indicated insolubility in aliphatic hydrocarbon solvents, the said precipitate being insoluble in evaporative hydrocarbon solvents having a kauri-butanol value no greater than 28.5 and soluble in evaporative hydrocarbon solvents having a kauri-butanol value greater than 50.

4. A tough and coherent body which is the precipitate from a vulcanization product containing at least 10% and no more than 50% oil soluble thermoplastic resin, and fatty acid triglycerides vulcanized to a stage of indicated insolubility in aliphatic hydrocarbon solvents, the said precipitate body being insoluble in evaporative hydrocarbon solvents having a kauri-butanol value no greater than 28.5 and soluble in evaporative hydrocarbon solvents having a kauri-butanol value greater than 50.

5. A tough and coherent body composed essentially of the combined vulcanization product of fatty acid triglycerides, and oil soluble thermoplastic resin in a proportion of from 10% to 50% the weight of the body, the said vulcanized body being insoluble in evaporative hydrocarbon solvents having a kauri-butanol value no greater than 28.5 and soluble in evaporative hydrocarbon solvents having a kauri-butanol value greater than 50.

6. A tough and coherent body which is the precipitate from a vulcanization product of fatty acid triglycerides and oil soluble thermoplastic resin, vulcanized to a stage of indicated insolubility in aliphatic hydrocarbon solvents and composed at least 10% and less than 65% of the oil soluble thermoplastic resin and fatty acid triglycerides, the said precipitate being composed essentially of the said combined vulcanization products and being insoluble in evaporative hydrocarbon solvents having a kauri-butanol value of 28.5 and soluble in evaporative hydrocarbon solvents having a kauri-butanol value greater than 50.

7. A tough and coherent vulcanized body composed essentially of the combined vulcanization products of fatty acid triglycerides and oil soluble thermoplastic resin, the said vulcanized body being insoluble in aliphatic hydrocarbon solvents having a kauri-butanol value of 28.5 and soluble in an equal volume of commercial toluol.

8. A tough and coherent vulcanized body composed essentially of the combined vulcanization products of fatty acid triglycerides and oil soluble thermoplastic resin, the said vulcanized body being insoluble in aliphatic hydrocarbon solvents having a kauri-butanol value of 28.5 and soluble in an equal volume of turpentine.

9. A tough and coherent vulcanized body composed essentially of the combined vulcanization products of fatty acid triglycerides and oil soluble thermoplastic resin, the said vulcanized body being the precipitate from the product of vulcanization in a combined mass of fatty acid triglycerides and oil soluble thermoplastic resin carried to a stage of indicated insolubility in aliphatic hydrocarbon solvents and precipitated from more than an equal volume of evaporative aliphatic hydrocarbon solvent, the said precipitate being insoluble in an equal volume of evaporative solvent having a kauri-butanol value of 28.5 and soluble in an equal volume of commercial toluol.

10. A tough and coherent vulcanized body composed essentially of the combined vulcanization products of fatty acid triglycerides and oil soluble thermoplastic resin, the said vulcanized body being the precipitate from the product of vulcanization in a combined mass of fatty acid triglycerides and oil soluble thermoplastic resin carried to a stage of indicated insolubility in aliphatic hydrocarbon solvents and precipitated from more than an equal volume of evaporative aliphatic solvent, the said precipitate being insoluble in an equal volume of evaporative solvent having a kauri-butanol value of 28.5 and soluble in an equal volume of turpentine.

11. The herein described method of making a tough coherent vulcanized body by vulcanizing a starting material composed essentially of fatty acid triglycerides and oil soluble thermoplastic resin and having at least 10% resin content to a stage of indicated insolubility in aliphatic hydrocarbon solvents, subjecting the product of the vulcanization to precipitation treatment with evaporative hydrocarbon solvent of low kauri-butanol value, and recovering the body of combined vulcanized fatty acid triglycerides and vulcanized oil soluble thermoplastic resin precipitated by treatment with the said low kauri-butanol value solvent.

12. The herein described method of making a tough coherent vulcanized body by vulcanizing a starting material composed essentially of fatty acid triglycerides and oil soluble thermoplastic resin and having a resin content of more than 10% and less than 50% to a stage of indicated insolubility in aliphatic hydrocarbon solvents, subjecting the product of the vulcanization to precipitation treatment with evaporative hydrocarbon solvent of low kauri-butanol value, and recovering the body of combined vulcanized fatty acid triglycerides and oil soluble thermoplastic resin precipitated by treatment with the said low kauri-butanol value solvent.

13. The herein described method of making a tough coherent vulcanized body by vulcanizing a starting material composed essentially of fatty acid triglycerides and oil soluble thermoplastic resin and having a resin content of more than 10% and less than 65% to a stage of indicated insolubility in aliphatic hydrocarbon solvents, subjecting the product of the vulcanization to precipitation treatment with evaporative hydrocarbon solvent of low kauri-butanol value, and recovering the body of combined vulcanized fatty acid triglycerides and oil soluble thermoplastic resin precipitated by treatment with the said low kauri-butanol value solvent.

14. The herein described method of making a tough coherent vulcanized body by vulcanizing a starting material composed essentially of fatty acid triglycerides and oil soluble thermoplastic resin and having at least 10% resin content to a stage of indicated insolubility in aliphatic hydrocarbon solvents, subjecting the product of the vulcanization to precipitation treatment with more than an equal volume of evaporative hydrocarbon solvent of low kauri-butanol value, and recovering the body of combined vulcanized fatty acid triglycerides and vulcanized oil soluble thermoplastic resin precipitated by treatment with the said low kauri-butanol value solvent.

15. The herein described method of making a tough coherent vulcanized body by vulcanizing a starting material composed essentially of fatty acid triglycerides and oil soluble thermoplastic resin and having a resin content of more than 10% and less than 50% to a stage of indicated insolubility in aliphatic hydrocarbon solvents, subjecting the product of the vulcanization to precipitation treatment with more than an equal volume of evaporative hydrocarbon solvent of low kauri-butanol value, and recovering the body of combined vulcanized fatty acid triglycerides and oil soluble thermoplastic resin precipitated by treatment with the said low kauri-butanol value solvent.

16. The herein described method of making a tough coherent vulcanized body by vulcanizing a starting material composed essentially of fatty acid triglycerides and oil soluble thermoplastic resin and having a resin content of more than 10% and less than 65% to a stage of indicated insolubility in aliphatic hydrocarbon solvents, subjecting the product of the vulcanization to precipitation treatment with more than an equal volume of evaporative hydrocarbon solvent of low kauri-butanol value, and recovering the body of combined vulcanized fatty acid triglycerides and oil soluble thermoplastic resin precipitated by treatment with the said low kauri-butanol value solvent.

JOHN W. CHURCH.